June 17, 1952  E. E. MEILSTRUP ET AL  2,600,513
TESTING PEDESTAL FOR RADAR ANTENNA
Filed Sept. 28, 1948  4 Sheets-Sheet 1

Inventors
Emil E. Meilstrup
Ross M. Sigmon, Jr.,
By
C. B. Hamilton
ATTORNEY

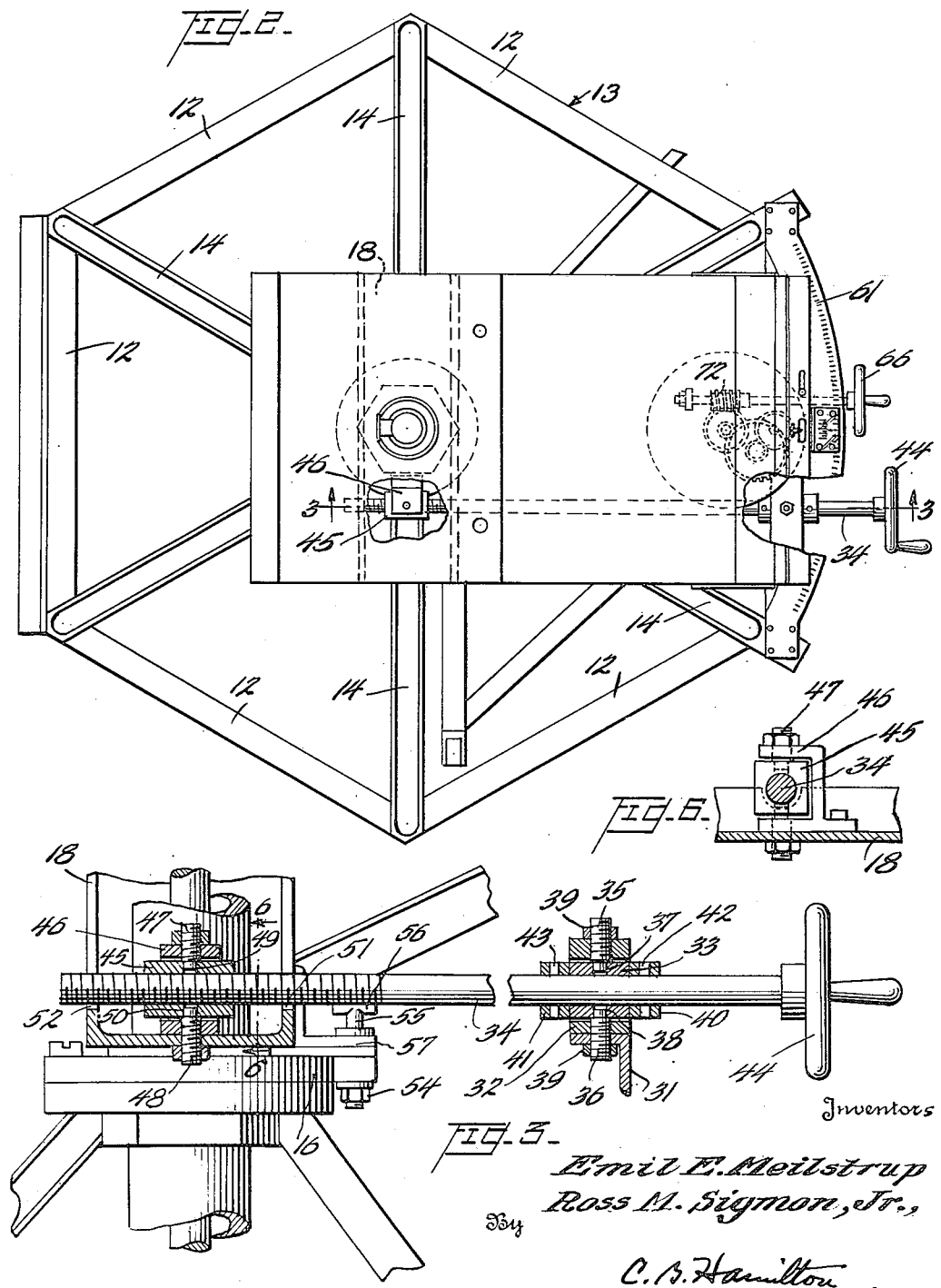

June 17, 1952    E. E. MEILSTRUP ET AL    2,600,513
TESTING PEDESTAL FOR RADAR ANTENNA
Filed Sept. 28, 1948    4 Sheets-Sheet 3
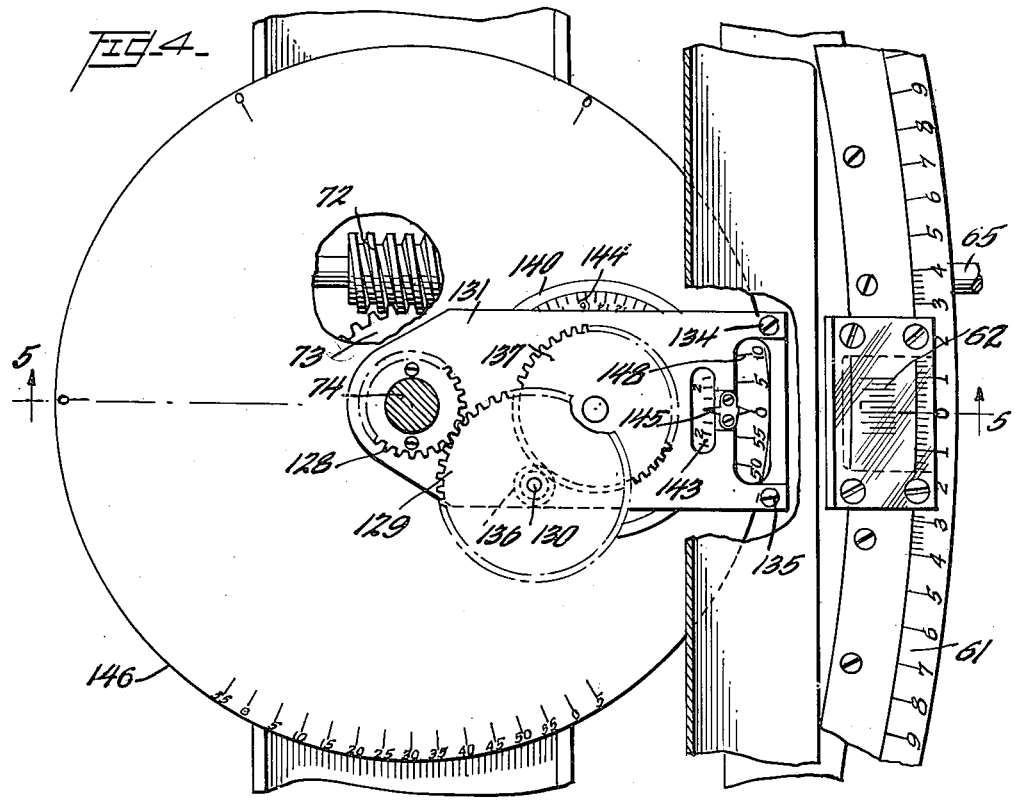
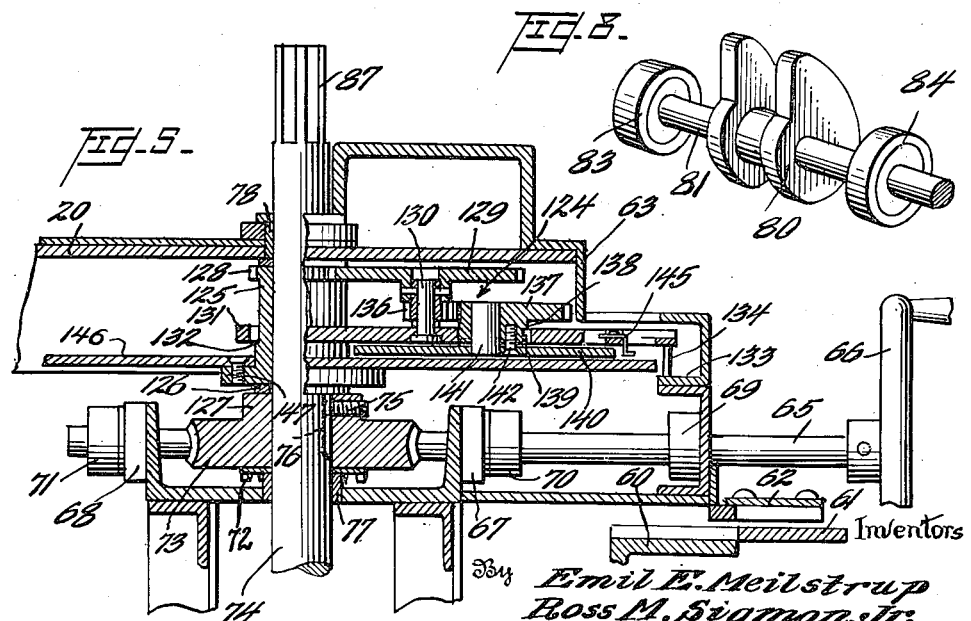

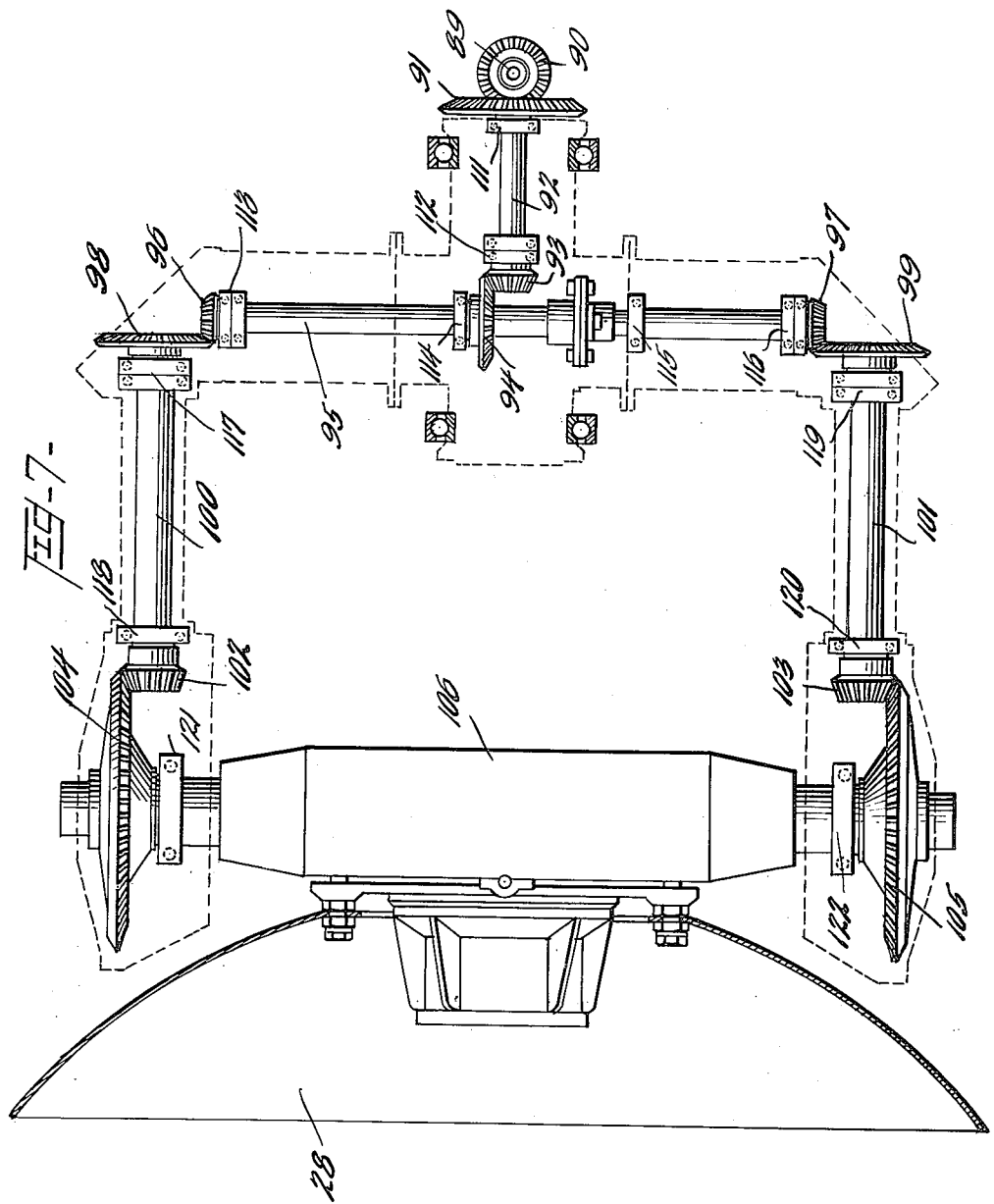

/ Patented June 17, 1952

2,600,513

UNITED STATES PATENT OFFICE 2,600,513

TESTING PEDESTAL FOR RADAR ANTENNA

Emil E. Meilstrup and Ross M. Sigmon, Jr., Winston-Salem, N. C., assignors to Western Electric Company, Incorporated, New York, N. Y., a corporation of New York Application September 28, 1948, Serial No. 51,606

5 Claims. (Cl. 250—33.51)

This invention relates to antenna supports and more particularly to an antenna support that can be adjusted to position a radar antenna at various selected elevations and azimuths.

During the past few years the use of radar apparatus has increased immensely because of its wide application in numerous fields. As this use has increased it has become imperative that radar antennas be mounted on supports that are capable of being adjusted to various desired azimuths and elevations. This is necessary since complete and adequate test of such antennas require that the antennas be placed in several preselected positions during the course of a test.

It is an object of this invention to provide an antenna support simple in construction for rapidly adjusting the antenna to desired azimuths and elevations and to provide indicating means for measuring the azimuths and elevations of the antenna in various selected positions.

In accordance with this and other objects, one embodiment of the invention provides a support comprising a rotatable platform to which an antenna to be tested is secured. This platform is rotatably mounted on a fixed base and has mounted thereto a mechanism for moving the platform about a vertical axis. Through a gear transmission, part of which is mounted on the base and the remainder of which is mounted within a radar unit under test, movement about a horizontal axis is obtainable. Actuating means in the forms of handwheels are provided to operate the mechanisms to rotate the antenna to various selected positions. Scales for indicating the degrees of elevation and azimuth to which the antenna is rotated are associated with each of the operating mechanisms.

Other advantages and objects will be apparent from the following detailed description taken in conjunction with the drawings wherein;

Fig. 2 is a top plan view of the antenna support including a rotatable platform, base, actuating mechanisms and indicating scales, but omitting the antenna and gear case;

Fig. 3 is an enlarged fragmentary sectional view of the swivel mechanism taken along the line 3—3 of Fig. 2, looking in the direction of the arrows;

Fig. 4 is an enlarged fragmentary top plan view of the indicating scale mechanism shown generally in Fig. 2;

Fig. 5 is an enlarged fragmentary sectional view of the indicating scale mechanism and the mechanism for imparting vertical movement to the antenna taken substantially along the line 5—5 of Fig. 4, looking in the direction of the arrows;

Fig. 6 is a fragmentary sectional view of a portion of the driving mechanism for rotating the antenna platform, which is taken along line 6—6 of Fig. 3;

Fig. 7 is a top plan view showing the gear mechanism for imparting vertical movement to the antenna;

Fig. 8 is a perspective view showing the mounting of the dual cam.

Figure 1:
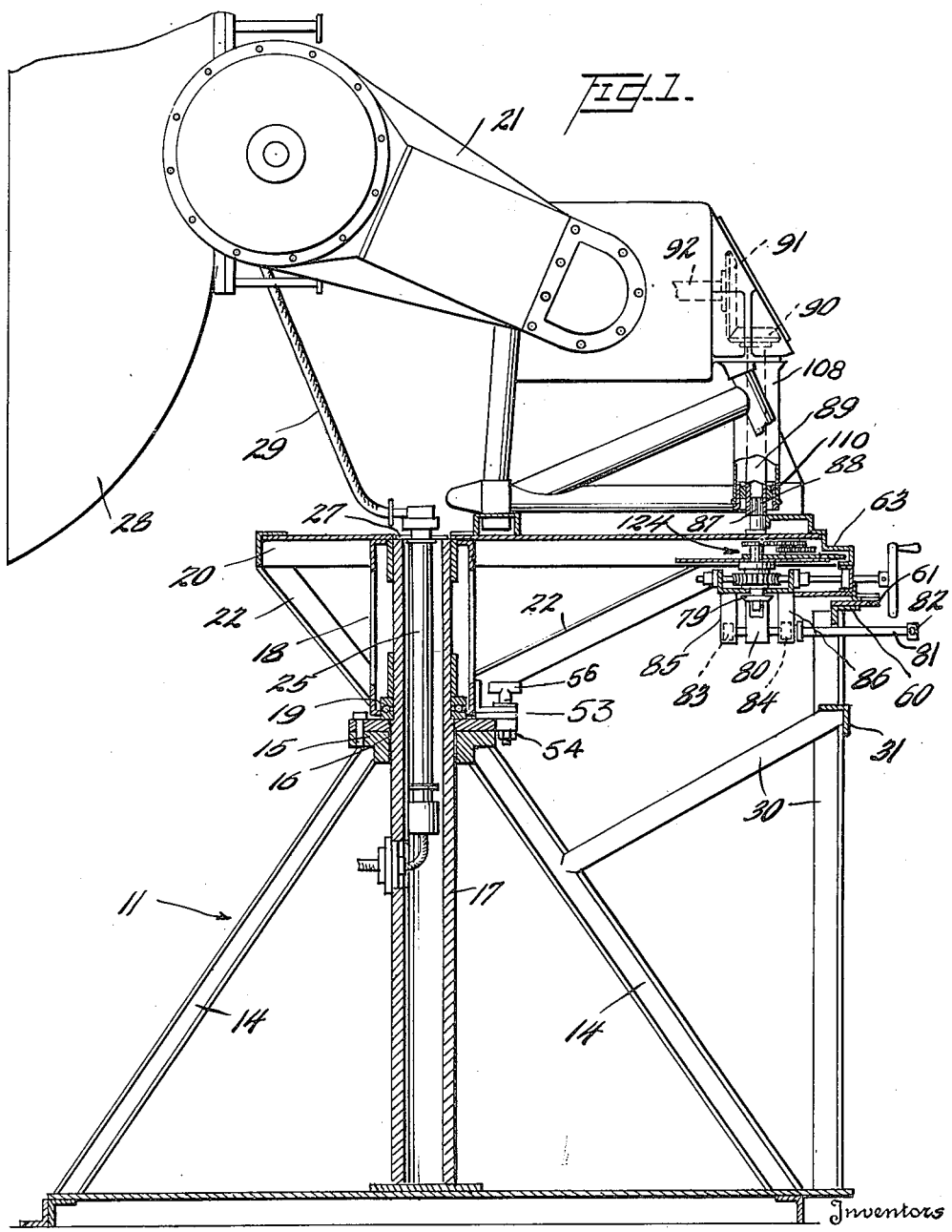
Fig. 1 is a front elevational view showing the antenna support with the antenna and associated gear case.

Referring now to the drawings, Fig. 1 illustrates a base generally designated by the reference numeral 11, this base includes six pieces of angle iron 12 welded together to form a hexagonal shaped structure 13 (Fig. 2). At each of the six corners of the structure 13 there is welded one end of one of six angle irons 14, the other ends of which are welded to and serve to support a stationary platform 15. Positioned within an aperture 16 of the stationary platform 15 and permanently secured therein is a center post 17 of tubular shape. A rectangular frame 18, surrounding the center post 17 but not secured thereto, is supported on the stationary platform 15 by means of a thrust bearing 19 so that rotary movement may be imparted to the frame about a vertical axis. Rigidly secured to the rectangular frame 18 by any suitable means, such as welding, is a rotatable platform 20 to which a radar unit generally designated by the reference numeral 21 is secured for test purposes. Providing additional support for the platform 20 are four metal struts 22 which are welded to the underside of the outer edge of the plateform 20 and to the rectangular frame 18 in the proximity of the thrust bearing 19.

A wave guide 25, positioned within the center post 17, is connected to an outside radar pulse producing generator (not shown) and is positioned at the top of the center post 17 by a retainer plate 27. The wave guide 25 is connected with an antenna 28 of radar unit 21 by a flexible cable 29. The flexibility of the cable 29 enables the antenna 28 to turn with the rotatable platform 20 while the wave guide 25 remains stationary within the center post 17. The wave guide 25 is used for the purpose of transmitting radar pulses from the generator to the radar antenna 28 under test mounted indirectly on the rotatable platform 20.

Welded to and forming a part of the base 11 is a pair of brackets 30 one of which is shown in Fig. 1 and connecting the two brackets together is a cross member 31 to which is welded a swivel bracket 32 (Fig. 3). As shown in Fig. 3 there is positioned within the swivel bracket 32 a bored swivel block 33 having a shaft 34 passing therethrough. The swivel block 33 pivots about a pair of set screws 35 and 36 which are threaded through a pair of threaded apertures in the swivel bracket 32 to pivotally engage a pair of recesses 37 and 38 in the swivel block 33. The set screws 35 and 36 are each provided with a jam nut 39 to hold the set screws 35 and 36 in an adjusted position. Axial movement of the shaft 34 within the swivel block 33 is prevented by means of a pair of collars 40 and 41 which are secured to the shaft 34 by pins 42 and 43. Permanently pinned to the right end of shaft 34 is a handwheel 44 and the left end of this shaft is threaded to engage an internally threaded swivel block 45 positioned within the rectangular frame 18. Secured to the inside bottom portion the rectangular frame 18 is a swivel bracket 46 having a pair of set screws 47 and 48 threaded therethrough to pivotally engage a pair of recesses 49 and 50 in the internally threaded swivel block 45. In the two side walls of the rectangular frame 18 there is provided a pair of horizontal elongated slots 51 and 52 for the purpose of allowing the shaft 34 to pivot about the set screws 47 and 48 without binding against the frame 18.

Inasmuch as the swivel bracket 46 is located offset of the axis of rotation of the frame 18, any movement of the swivel bracket 46, such as caused by the turning of threaded shaft 34 in the threaded swivel block 45, results in rotation of the frame 18.

To obtain horizontal angular movement of the radar antenna, the handwheel 44 is turned, thus the threaded shaft 34 moves the swivel block 45 axially of the shaft 34 and as axial movement of the shaft 34 is prevented by pinned collars 40 and 41, the movement of the swivel block 45 causes the rectangular frame 18 to rotate about the center post 17 and carry with it the platform 20 to which the radar unit 21 is secured.

After the desired horizontal rotation is obtained, the rotatable platform 20 can be locked in position by means of a locking device 53 consisting of a nut 54 and a screw 55 having a knurled knob 56. The screw 55 passes through a pair of corresponding arcuate slots (not shown) located in a flanged section 57 of the rectangular frame 18 and in the stationary platform 16. Therefore, when the nut 54 is drawn upon the screw 55 by turning the knurled knob, the flange 57 is brought into binding engagement with the stationary platform 16 to prevent any further movement of the flange 57 and rectangular frame 18 relative to the stationary base 11.

The brackets 30 are also connected together by means of a second cross member 60 to which is secured an arcuate scale 61 (Figs. 1, 2 and 4) for the purpose of measurement of horizontal angular movement. A vernier 62 (Figs. 4 and 5) fastened to a mechanism housing 63 which in turn is secured to the rotatable platform 20 serves as an indicator for the scale 61 and also provides a means to give a more exact reading of the horizontal angular movement.

The mechanism housing 63 (Figs. 1 and 5) consists of a plurality of sections welded together to form a housing for the operating mechanism and indicating scales of the antenna elevating apparatus. A shaft 65 (Fig. 5) having a crank type handwheel 66 secured to one end is journaled in the housing 63 by means of bearings 67 and 68 mounted in the housing 63. To prevent axial movement of the shaft 65 relative to the housing, three collars 69, 70 and 71 are pinned to shaft 65 abutting the bearings 67 and 68 and the housing 63. Positioned between the bearings 67 and 68 and keyed to the shaft 65 is a worm gear 72 engaging a spur gear 73 through which a shaft 74 is slidably mounted. A suitable key 75 in the form of a set screw projects into an elongated longitudinal keyway 76 to prevent rotation of the shaft 74 relative to the spur gear 73 but permits the shaft 74 to move transversely of the spur gear 73. The shaft 74 is journaled within the housing 63 by means of a plain bearing 77 and a plain bearing 78 mounted in the rotatable platform 20. Fixed to one end of this shaft 74 is a circular flange 79 (Fig. 1) which is adapted to be engaged by the periphery surface of dual cam 80. Passing through an aperture in the cam and rigidly keyed thereto is a shaft 81 having a handle 82 secured at one end thereof. This shaft is journaled within a pair of bearings 83 and 84 mounted in a pair of brackets 85 and 86 (Figs. 1 and 8) which are secured to the mechanism housing 63. The opposite end of shaft 74 is splined to form a gear 87 to mesh with an internal socket gear 88 contained in a hollow shaft 89 which is part of the radar unit 21.

It is through the shaft 74 that motion is transmitted to the radar unit 21 to control an elevating mechanism contained therein. Thus if the cam 80 is in the position as shown in Fig. 1 the high spot of the cam engages the circular flange 79 to hold the splined gear 87 in engagement with the internal socket gear 88 of the radar unit. However, if the radar antenna is in the proper elevation and it is desired that further accidental elevation of the radar antenna is to be prevented, then the handle 82 is turned causing the shaft 74 and the flange 79 to follow the contour of the cam 80 thus disengaging the splined gear 87 from the internal socket gear 88 of the radar unit 21.

The gear train through which the elevation of the antenna 28 is adjusted by a rotation of the splined gear 87 is shown in Figs. 1 and 7. The transmission of motion within the radar unit 21 may be traced from the socket gear 88 through the shaft 89 to a bevel gear 90 secured to the end of shaft 89 to a mating bevel gear 91 secured to one end of a shaft 92, through the shaft 92 to a bevel gear 93 secured to the opposite end of the shaft 92, to a mating bevel gear 94 secured near the center of a shaft 95, through the shaft 95 to a pair of bevel gears 96 and 97 secured to each end of the shaft 95, to a pair of mating bevel gears 98 and 99 each of which are secured to one end of shafts 100 and 101, through the shafts 100 and 101, to a pair of bevel gears 102 and 103 secured to shafts 100 and 101, respectively, to a pair of mating bevel gears 104 and 105 each of which are secured to an end of a shaft 106 and finally to the radar antenna 28 which is secured to the shaft 106.

The shaft 89 (Fig. 1) is mounted within a casing 108 by means of a bearing 110. The remaining shafts 92, 95, 100, 101 and 106 (Fig. 7) forming part of the radar unit 21 are each mounted within bearings fixed within brackets 111 and 112; 113, 114, 115 and 116; 117 and 118; 119 and 120; 121 and 122, respectively, which are in turn rigidly secured to the housing of the radar unit 21.

Referring to Figs. 4 and 5, a mechanism 124 for indicating the degree of elevation of the radar antenna 28 is disclosed as being contained within the housing 63. The indicating mechanism 124 consists of a hub 125 mounted on the shaft 74 and positioned thereon by means of a washer 126 resting on top of a hub 127 of gear 73. Secured to the hub 126 is a pinion 128 having a suitable key (not shown) which engages the keyway 76 to prevent rotative movement of the pinion 128 and the hub 127 relative to the shaft 74. This combination key and keyway allows axial movement of the shaft 74 with respect to the pinion 128 in a manner similar to that described in regard to gear 73 and shaft 74. The pinion 128 drives a gear 129 secured to a rotatable pin 130 journaled in a plate 131. This plate is apertured to fit the hub 125 and is positioned thereon by a flange 132. In order to prevent the plate 131 from rotating with the hub 125, the plate is secured to a projecting section 133 of the housing 63 by means of a pair of machine bolts 134 and 135. Positioned between the gear 129 and the plate 131 is a pinion 136 secured on the rotatable pin 130 and in meshing engagement with a gear 137. This gear 137 has a hub 138 which is mounted for rotation in a bearing 139 located in an aperture in the plate 131.

To the hub 138 of gear 137 a scaled disc 140 for indicating the degree of elevation of the radar antenna 28 is secured by means of a locating pin 141 and a flat headed screw 142. The plate 131 has an elongated slot 143 therein for the purpose of viewing the indicia 144 (Fig. 4) on the disc 140. A pointer 145 secured to the plate 131 has one end projecting into the elongated slot 144 for the purpose of facilitating an exact reading of the indicia 144 of the scaled disc 140. In order that a more accurate reading can be obtained, an auxiliary scaled disc 146 (Fig. 5) secured directly to a flange 147 on hub 125 is provided so as to move in conjunction with scaled disc 140 to give readings in minutes. The plate 131 is provided with an additional slot 148 into which the other end of pointer 145 projects so that exact readings in minutes of the elevation of the radar antenna 28 can be obtained. Thus by taking simultaneous readings on the scaled disc 140 and the scaled disc 146 exact changes in the elevation of the radar antenna 28 can be obtained in degrees and minutes.

In the embodiment of the invention disclosed, the gearing of the indicating mechanism is selected so that the disc scale 140 rotates in a ratio of 6:1 with respect to the rotation of the shaft 106 of the radar antenna 28. The disc scale 140 is provided with 60 equally spaced markings about the outer edge so that for every degree change in the elevation of the antenna 28 the disc makes 1/60 of a revolution and gives a reading of one degree. The large disc 146 is divided in to sextants each of which are provided with 60 equally spaced markings at the outer edge. Thus for each degree that the antenna is elevated the large disc makes 1/6 of a revolution to indicate a 60 minute change in elevation. It is to be understood that the particular gearing combinations described are merely illustrative, and that numerous other combinations can be employed to give identical or more exact readings than the one shown and described.

It is to be understood that the above-described arrangements of structures and mechanisms are simply illustrative of the application of the principles of the invention. Numerous other arrangements may be readily devised by those skilled in the art which will embody the principles of the invention and fall within the spirit and scope thereof.

What is claimed is:

1. In a testing device for a radar antenna, a base, a platform rotatably mounted on the base, means for mounting a radar antenna on the platform, a spline gear slidably mounted with respect to the platform, a gear train mounted on the platform to rotate the radar antenna about a horizontal axis, a cam mounted on the platform for selectively moving the spline gear into and out of engagement with the gear train, means for rotating the spline gear to actuate the gear train, a swivel having a threaded aperture therein, said swivel secured to the platform and offset from the axis of rotation thereof, a second swivel having an aperture therein secured to the base, a threaded shaft passing through the second apertured swivel to engage the threaded swivel, and means to rotate the shaft to move the threaded swivel toward the second swivel to rotate the platform about a vertical axis.

2. In a testing device for a radar antenna, a base, a rotatable platform mounted on the base, a device to be tested mounted on the rotatable platform, a first swivel secured to the platform and offset from the axis of rotation thereof, a second swivel secured to the base, means interconnecting the swivels for moving the first swivel toward the second swivel whereby the platform is rotated about a vertical axis, a gear train mounted on said platform, a drive mechanism mounted on the platform, and means to selectively engage the drive mechanism with the gear train to rotate the antenna about a horizontal axis.

3. In a testing device for a radar antenna, a base, a rotatable platform mounted on the base, a device to be tested mounted on the rotatable platform, a first swivel mounted on the platform and offset from the axis of rotation thereof, a second swivel mounted on the base, means interconnecting the swivels for moving the first swivel axially along the interconnecting means toward the second swivel whereby the platform is rotated about a vertical axis, a gear train mounted on said platform, a drive mechanism mounted on the platform, cam means for selectively engaging the drive mechanism with the gear train to rotate the antenna to be tested about a horizontal axis, and indicating means for measuring the extent of vertical and horizontal movement.

4. In a testing device for a radar antenna, a base, a platform rotatably mounted on a base, means for mounting a radar antenna on the platform, a spline gear slidably mounted with respect to the platform, a gear train mounted on the platform to rotate the radar antenna about a horizontal axis, a cam mounted on the platform for selectively moving the spline gear into and out of engagement with the gear train, means for rotating the spline gear to actuate the gear train, a swivel having a threaded aperture therein, said swivel secured to the platform and offset from the axis of rotation, a second swivel having an aperture therein and secured to the base, a threaded shaft passing through the second apertured swivel to engage the threaded swivel, means to rotate the shaft to move the threaded swivel toward the second swivel to rotate the platform about a vertical axis, and indicating means for measuring the extent of vertical and horizontal movement.

5. In a testing mount, a stationary support, a rotatable platform mounted on the stationary support, a device to be tested mounted on said rotatable platform, means to rotate the platform about a vertical axis comprising a first swivel mounted on the rotatable platform and offset from the center of rotation thereof, a second swivel mounted on the base, means interconnecting the swivels for moving the first swivel toward the second swivel whereby the platform is rotated, means to lock the rotatable platform to the stationary support when a predetermined position is attained, and means to selectively disengage the means which rotates the device about a horizontal axis, the operation of said disengaging means being independent of the position of said device.

EMIL E. MEILSTRUP.
ROSS M. SIGMON, JR.

REFERENCES CITED

The following references are of record in the file of this patent:

UNITED STATES PATENTS

| Number | Name | Date |
| --- | --- | --- |
| 234,284 | Jackson | Nov. 9, 1880 |
| 1,377,292 | Thomas | May 10, 1921 |
| 1,652,499 | Schwab | Dec. 13, 1927 |
| 1,700,902 | Prieur | Feb. 5, 1929 |
| 1,932,469 | Leib | Oct. 31, 1933 |
| 2,007,031 | Pattensteiger | July 2, 1935 |
| 2,235,898 | Niemeyer | Mar. 25, 1941 |
| 2,257,320 | Williams | Sept. 30, 1941 |
| 2,304,446 | Eaton | Dec. 8, 1942 |
| 2,352,270 | Land | June 27, 1944 |
| 2,356,861 | Link | Aug. 29, 1944 |
| 2,407,305 | Langstroth | Sept. 10, 1946 |
| 2,407,310 | Lundy | Sept. 10, 1946 |
| 2,410,827 | Langstroth | Nov. 12, 1946 |
| 2,410,831 | Maybarduk | Nov. 12, 1946 |
| 2,415,678 | Edwards | Feb. 11, 1947 |
| 2,416,155 | Chubb | Feb. 18, 1947 |
| 2,427,005 | King | Sept. 9, 1947 |
| 2,469,970 | Lear | May 10, 1949 |
| 2,479,539 | Moseley | Aug. 16, 1949 |